US011797389B2

(12) United States Patent
Yu et al.

(10) Patent No.: US 11,797,389 B2
(45) Date of Patent: Oct. 24, 2023

(54) SYSTEM AND METHOD FOR RECOVERING AN OPERATING SYSTEM AFTER AN UPGRADE HANG USING A DUAL-FLASH DEVICE

(71) Applicant: EMC IP Holding Company LLC, Hopkinton, MA (US)

(72) Inventors: Xinghai Yu, Hopkinton, MA (US); Colin Zou, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 235 days.

(21) Appl. No.: 16/877,790

(22) Filed: May 19, 2020

(65) Prior Publication Data
US 2021/0365322 A1 Nov. 25, 2021

(51) Int. Cl.
G06F 11/14 (2006.01)
G06F 9/445 (2018.01)
G06F 11/07 (2006.01)
G06F 8/65 (2018.01)

(52) U.S. Cl.
CPC ...... *G06F 11/1433* (2013.01); *G06F 9/44505* (2013.01); *G06F 11/0757* (2013.01); *G06F 11/0793* (2013.01); *G06F 11/1417* (2013.01); *G06F 11/1441* (2013.01); *G06F 8/65* (2013.01)

(58) Field of Classification Search
CPC ............ G06F 11/1433; G06F 9/44505; G06F 11/0757; G06F 11/0793; G06F 11/1417; G06F 11/1441; G06F 8/65; G06F 9/4401
See application file for complete search history.

(56) References Cited

U.S. PATENT DOCUMENTS

| 6,009,524 | A | * | 12/1999 | Olarig | G06F 21/572 709/225 |
| 6,330,715 | B1 | | 12/2001 | Razzaghe-Ashrafi | |
| 7,340,638 | B2 | | 3/2008 | Nicholson et al. | |
| 3,060,794 | A1 | | 11/2011 | Wu | |
| 8,924,952 | B1 | * | 12/2014 | Hou | G06F 8/65 717/172 |
| 2002/0194527 | A1 | | 12/2002 | Murai et al. | |
| 2003/0005037 | A1 | | 1/2003 | Aija et al. | |
| 2004/0153724 | A1 | * | 8/2004 | Nicholson | G06F 11/0709 714/E11.133 |

(Continued)

FOREIGN PATENT DOCUMENTS

CN 105912414 A * 8/2016

OTHER PUBLICATIONS

Google Scholar/Patents—text refined (Year: 2021).
Google Scholar/Patents—text refined (Year: 2022).

*Primary Examiner* — Bryce P Bonzo
*Assistant Examiner* — Michael Xu
(74) *Attorney, Agent, or Firm* — WOMBLE BOND DICKINSON (US) LLP

(57) ABSTRACT

One embodiment provides a computer implemented method for recovering an operating system (OS) after an upgrade hang using a dual-flash device. The method includes detecting a system hang during an OS upgrade; initiating a boot from the dual-flash device; checking for OS configuration data in the dual-flash device; creating a hook in OS boot scripts to recover the OS configuration data after OS boot; and applying the OS configuration data after OS boot.

18 Claims, 7 Drawing Sheets

(56) References Cited

U.S. PATENT DOCUMENTS

| | | | |
|---|---|---|---|
| 2004/0243992 A1* | 12/2004 | Gustafson | G06F 8/65 717/168 |
| 2008/0052507 A1 | 2/2008 | Chow et al. | |
| 2008/0209261 A1* | 8/2008 | Zhang | G06F 11/1666 714/6.12 |
| 2014/0122860 A1 | 5/2014 | Jai et al. | |
| 2014/0211637 A1* | 7/2014 | Sawal | H04L 41/06 370/244 |
| 2015/0154092 A1 | 6/2015 | Chen | |
| 2015/0277934 A1 | 10/2015 | Zhang et al. | |
| 2016/0124741 A1* | 5/2016 | Hu | H04L 67/34 717/171 |
| 2017/0277468 A1 | 9/2017 | Nakayama | |
| 2017/0277545 A1 | 9/2017 | Dambal et al. | |
| 2018/0088962 A1* | 3/2018 | Balakrishnan | G06F 11/0757 |
| 2018/0136939 A1* | 5/2018 | Li | G06F 9/4406 |
| 2019/0042368 A1* | 2/2019 | Khatri | G06F 21/554 |
| 2019/0187977 A1* | 6/2019 | Szwarc | G06F 8/63 |
| 2019/0196864 A1* | 6/2019 | Du | G06F 9/485 |
| 2020/0272445 A1 | 8/2020 | Lang | |
| 2021/0004242 A1 | 1/2021 | Su | |
| 2021/0365261 A1* | 11/2021 | Yu | G06F 8/654 |
| 2021/0365270 A1* | 11/2021 | Yu | G06F 9/4408 |
| 2021/0365322 A1 | 11/2021 | Yu et al. | |
| 2021/0365323 A1* | 11/2021 | Yu | G06F 11/1417 |

\* cited by examiner

SYSTEM AND METHOD FOR RECOVERING AN OPERATING SYSTEM AFTER AN UPGRADE HANG USING A DUAL-FLASH DEVICE

RELATED APPLICATIONS

This application is related to U.S. application Ser. No. 16/877,761 filed on May 19, 2020, U.S. application Ser. No. 16/877,958 filed on May 19, 2020, and U.S. application Ser. No. 16/877,794 filed on May 19, 2020. The disclosures of each of these related applications are incorporated herein by reference in their entirety.

FIELD OF THE INVENTION

Embodiments of the present invention relate generally to rebooting and restoring operating systems (OS). More particularly, embodiments of the invention provide for OS reinstallation and recovery using a dual-flash hardware device.

BACKGROUND

Commercial data centers run a very large number of backup storage appliances that receive a large number of service requests regarding fixing corrupted systems. Systems can be corrupted during run-time, reboot, power failures, or during OS upgrades, etc. For example, a root file system can be corrupted due to a power failure, or OS software can be corrupted during an upgrade. When an appliance runs into a critical error, such as when a head controller root file system is corrupted, OS files are lost, OS software bugs are found, etc., a support engineer may need to trouble shoot and resolve these issues by restoring the appliance OS.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
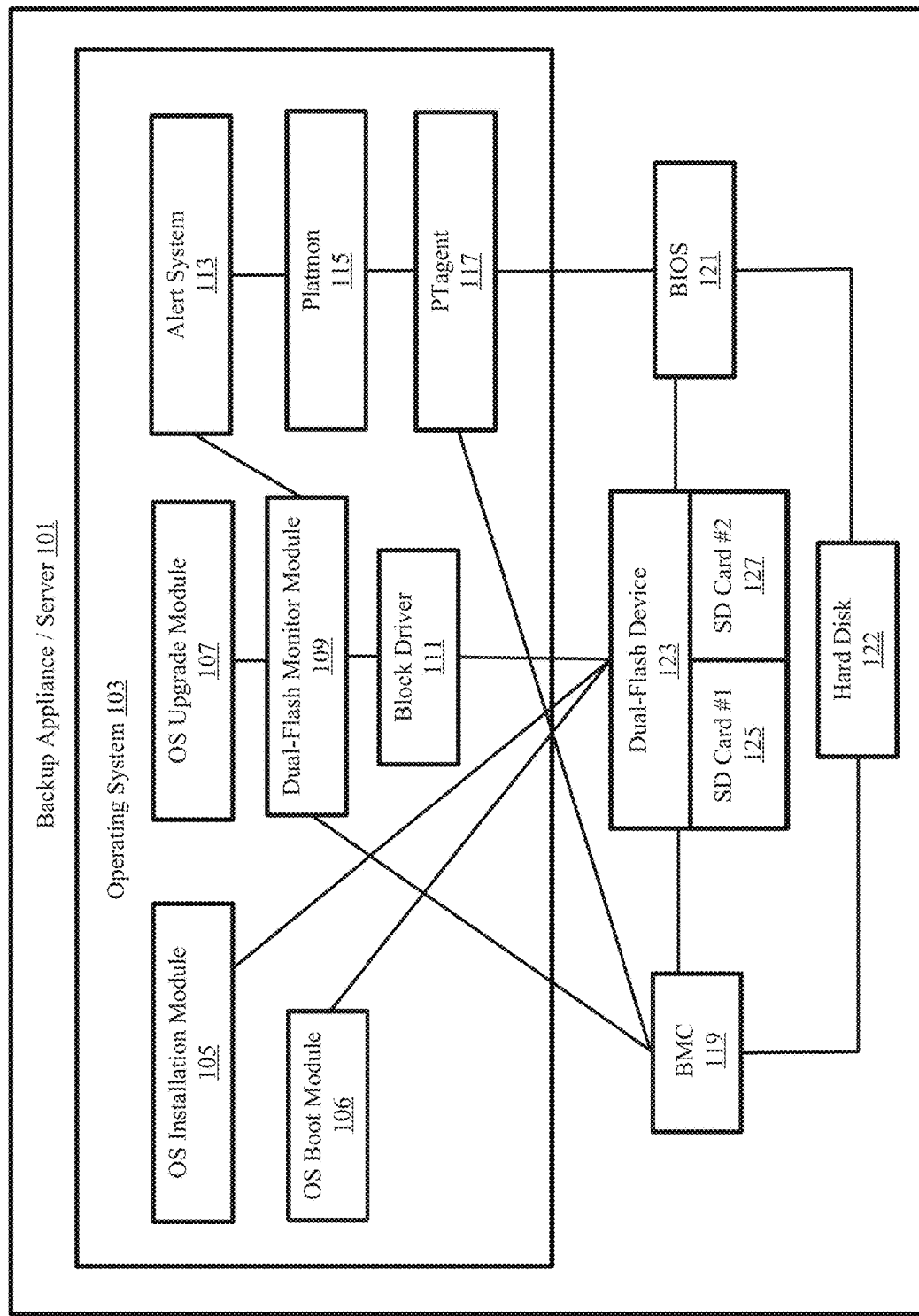
FIG. 1 is a block diagram illustrating a server or backup appliance with an OS reboot and restoration system, according to an embodiment.

Embodiments described herein provide for a computer implemented method for recovering an operating system (OS) after an upgrade hang using a dual-flash device. The method includes detecting a system hang during an OS upgrade; initiating a boot from the dual-flash device; checking for OS configuration data in the dual-flash device; creating a hook in OS boot scripts to recover the OS configuration data after OS boot; and applying the OS configuration data after OS boot. In some embodiments, the method also includes saving the OS configuration data into the dual-flash device before initiating the OS upgrade. In some embodiments, the method also includes performing a subsequent OS upgrade after OS boot and after applying the OS configuration data. In some embodiments, the system hang is detected during the OS upgrade by a watchdog timer within a baseboard management controller (BMC). In some embodiments, the watchdog timer expires after failing to receive a heartbeat signal within one minute. In some embodiments, a dual-flash monitor module is configured to relay the heartbeat signal from an OS upgrade module to the BMC.

Another aspect of the present disclosure includes a system for recovering an operating system (OS) after an upgrade hang using a dual-flash device. The system includes a server; a baseboard management controller (BMC) configured to detect a system hang during an upgrade to an OS of the server; and a dual-flash device configured to initiate a boot upon detecting a system hang during the OS upgrade. The system also includes a dual-flash monitor module configured to check for OS configuration data in the dual-flash device, and create a hook in OS boot scripts to recover the OS configuration data after OS boot. The system also includes an OS boot module configured to apply the OS configuration data after the boot from the dual-flash device. In some embodiments, the dual-flash monitor module is further configured to save the OS configuration data into the dual-flash device before the OS upgrade initiates. In some embodiments, the system also includes an OS upgrade module configured to perform a subsequent OS upgrade after OS boot and after the OS boot module applies the OS configuration data. In some embodiments, the BMC includes a watchdog timer configured to detect the system hang during the OS upgrade. In some embodiments, the watchdog timer is configured to expire after failing to receive a heartbeat signal within one minute. In some embodiments, a dual-flash monitor module is configured to relay the heartbeat signal from the OS upgrade module to the BMC.

Another aspect of the present disclosure includes a non-transitory computer-readable medium storing instructions which, when executed by one or more processors, cause the one or more processors to perform an upgrade hang operating system (OS) recovery operation using a dual-flash device. The operation includes detecting a system hang during an OS upgrade; initiating a boot from the dual-flash device; checking for OS configuration data in the dual-flash device; creating a hook in OS boot scripts to recover the OS configuration data after OS boot; and applying the OS configuration data after OS boot. In some embodiments, the operation also includes saving the OS configuration data into the dual-flash device before initiating the OS upgrade. In some embodiments, the operation also includes performing a subsequent OS upgrade after OS boot and after applying the OS configuration data. In some embodiments, the system hang is detected during the OS upgrade by a watchdog timer within a baseboard management controller (BMC). In some embodiments, the watchdog timer expires after failing to receive a heartbeat signal within one minute. In some embodiments, a dual-flash monitor module is configured to relay the heartbeat signal from an OS upgrade module to the BMC.

A large amount of system corruptions can be fixed by re-installing a head controller without impacting user data in disk enclosures. This is because user data is located on a separate filesystem, and a reinstalled head controller can take over an existing filesystem. However, if reinstallation is required, days or weeks may be required to send a service engineer to a customer site to manually fix problems.

Many systems already include a dual-flash device, such as an Internal Dual SD Module (IDSDM) that supports two SD flash cards. However, typically and IDSDM is only used for factory OS installation and restoring servers to factory setting. In such cases, there is no ability to install an upgraded OS or perform auto-recovery from corruption. As a result, once the system has been upgraded to a higher version, the installation files in the IDSDM device are obsolete.

Once the OS installation is completed, monitoring and upgrades must also be completed. According to previous techniques, if an OS crash occurs, either during an installation or during an upgrade, a support engineer needs to physically visit the data center, locate the crashed device, and perform a restoration using an external flash device, such as a USB device. The IDSDM device is located already on the crashed device, however several years of upgrades can have occurred, and the IDSDM device is typically only able to install to the original factory settings. For example, if five years have passed, restoring from the IDSDM device would lose five years of upgrades, and it would not be worth performing the restoration. Furthermore, the manual operation of burning installation files onto a USB flash drive takes time and can introduce errors easily. The installation files may include many software components, and those components all have different versions. Support engineers must choose the correct versions and burn them onto the USB flash drive step by step manually. Finally, physically attaching a USB flash drive to a system may conflict with a customer's security policies.

In one embodiment of the present disclosure, a new software module is disclosed to make use of the dual-flash device to better support upgrade processes, remotely restore an OS to the last upgraded OS version without a USB stick, and to support automatic recovery from an OS upgrade hang error or a runtime hang error. The dual-flash monitor module can also automatically restore a system to the last OS version when there is a system corruption requiring OS reinstallation.

In some embodiments, the dual-flash monitor module is configured to monitor all the files in the IDSDM device. The files get updated, and this module continually monitors the status of the IDSDM device. Furthermore, in some embodiments, there is a new workflow for upgrading the OS by connecting the OS upgrade component with the IDSDM monitor module, in order to update the OS installation files in the IDSDM after an OS upgrade. The OS installation files in the IDSDM device are updated by the IDSDM monitor module after an OS upgrade in order to match the running OS version. In some embodiments, the upgrade to the IDSDM device can be performed first, and then the OS upgrade. In some embodiments, both the SD cards in the IDSDM can be updated at the same time, or in sequence. Thus, a support engineer can directly leverage the IDSDM device in order to restore the OS to the running OS version when needed.

According to one embodiment, factory OS installation on a storage appliance or server can be performed using the dual-flash device. The dual-flash device of the storage appliance is burned with the OS installation files in the factory. Thus, the storage appliance leaves the factory with the dual flash device burned with the OS installation files, so that the storage appliance can boot from the dual flash device and trigger OS installation. After OS installation, the Basic Input/Output System (BIOS) of the storage appliance or server can be set to boot from a hard disk going forward.

In one embodiment of the present disclosure, the dual-flash monitor module can monitor the status of the dual-flash device and correct any unexpected hardware problems or file corruptions. The dual-flash monitor module can perform a checksum to monitor files inside the dual-flash device and can reinitialize the dual-flash device if corruption occurs or the device is replaced. This re-initialization behavior can improve serviceability of the dual-flash device and make sure it can operate when needed.

In one embodiment of the present disclosure, the dual-flash device can facilitate an automatic recovery from an OS upgrade hang error. An OS upgrade includes many steps, and a notable amount of cases in the field produce upgrade hang errors. A dual-flash monitor module can configure a BMC before the OS upgrade to detect an upgrade hang and recover the original OS from the dual-flash device. When an OS upgrade is about to take place, the dual-flash monitor module can save the OS configuration data and set a watchdog timer in the BMC before the OS upgrade starts. The dual-flash monitor module can reset the timer every 60 seconds, for example, and if an OS upgrade hang occurs the watchdog timer will not be reset in time. The BMC will then reset the appliance or server and trigger an OS recovery via the dual-flash device.

In one embodiment of the present disclosure, the dual-flash device can facilitate automatic recovery from an OS runtime hang error. During normal server operation, the BMC can be updated with a watchdog timer to monitor the OS status. If an OS hang occurs, the BMC initiates a reset and reboot. If the OS reboot fails, then the BMC can initiate reinstallation from the dual-flash device.

The aspects and embodiments of the present disclosure described herein can provide one or more of the following advantages. The system disclosed herein can restore a server or appliance to the last upgraded OS version instead of the old factory settings, all based on a local dual-flash device. According to the techniques disclosed herein, OS restoration no longer depends on the use or connection of a foreign USB flash device. The OS restoration can be done via the dual-flash device already located at the system. The techniques disclosed herein also eliminate the manual operations of burning installation files onto a USB flash drive. These operations are all done inside the OS during OS running time. Alternatively, a support engineer can directly do the restoration via the dual-flash device inside the appliance at the customer site. In some embodiments, when an OS is corrupted and needs to be installed, the dual-flash monitor module can detect this corruption and automatically recover the OS by reinstalling it. In some such cases, system firmware changes may be required in order to monitor the OS status and initiate reinstallation.

In some embodiments, the techniques described herein can improve the maintainability of a server or backup appliance. Installation files in a dual-flash device can be updated automatically by the dual-flash monitor module, so that the version of the OS installation files in the dual-flash device always matches the running OS version. In this way, the dual-flash device can always be ready for OS restoration, which means that a support engineer can perform a remote restoration at any time. This reduces the probability of conflict with a customer's security policy by allowing recovery via an internal device, without the need for an external USB drive, or other external device.

Some embodiments of the present disclosure can provide support for automatically recovering an OS from an OS upgrade hang error. Before an OS upgrade, all OS configuration data can be saved into the dual-flash device so that, if an OS upgrade hang error occurs, a baseboard management controller (BMC) can detect the OS hang condition and trigger an OS recovery via the dual-flash device to recover the appliance to its original state before the attempted OS upgrade.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the description of the embodiments provided herein, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

System Overview

FIG. 1 is a block diagram 100 illustrating a server or backup appliance 101 with an OS reboot and restoration system, according to embodiments of the present disclosure. In this embodiment, the appliance or server 101 includes an OS 105, and within the OS 105 there are multiple modules. In this embodiment, the OS 103 includes an OS installation module 105, an OS boot module 106, an OS upgrade module 107, a dual-flash monitor module 109, a block driver 111, an alert system 113, a Platmon 115 or platform monitoring module, and a PTagent module 117. The server 101 also includes a dual-flash device 123 that includes a first SD card 125 and a second SD card 127. The dual-flash device 123 is in communication with a BMC 119, BIOS 121, and a hard disk 122, in this embodiment.

The BIOS 121 can synchronize the contents of the two SD cards 125, 127 of the dual-flash device 123. The dual-flash device 123 provides redundancy by using mirrored SD cards, such that the second SD card 127 mirrors the contents of the first SD card 125. Either of the two SD cards 125, 127 can be used as the master. Table 1, below, shows an example BIOS setting of the dual-flash device 123. By setting the "Internal SD Card Redundancy" with "Mirror", the BIOS 121 can synchronize the contents of the two SD cards automatically.

TABLE 1

| Section Setting | Values | Default Value Setting |
| --- | --- | --- |
| Internal SD Card Port | On/Off | On |
| Internal SD Card Redundancy | Disabled/Mirror | Mirror |
| Internal SD Primary Card | SD Card 1/SD Card 2 | SD Card 1 |

The dual-flash device 123 can support the OS installation module 105 and the OS boot module 106. The dual-flash monitor module 109 can communicate with the dual-flash device 123 via a block driver 111, and can also communicate with the BMC 119. In some embodiments, the dual-flash monitor module 109 communicates a heartbeat signal to the BMC 119.

In one embodiment, the dual-flash device 123 supports OS installation by having installation files burned into the dual-flash device 123. In this way, the appliance 101 can boot from the dual-flash device 123. In some embodiments, the dual-flash device 123 is a mirrored Internal Dual SD Module (IDSDM). The OS boot module 106 can be utilized to boot the appliance 101.

In one embodiment, the Platmon 115 can monitor the hardware status of the dual-flash device 123 via the PTagent 117. The PTagent 117 can get the hardware status of the dual-flash device 123 from the BMC 119 and the BIOS 121, in some embodiments. Once the Platmon 115 finds that there is a hardware error of the dual-flash device 123, or one of the SD cards 125, 127, the alert system 113 can post an alert so that a support engineer can replace the damaged hardware component.

In one embodiment, the dual-flash monitor module 109 can begin monitoring the dual-flash device 123 upon OS boot up, and can check the contents of the dual-flash device 123 regularly to install updates, detect file corruption, detect upgrade or runtime hang errors, and reinitialize the dual-flash device 123. For example, after an OS upgrade, performed by the OS upgrade module 107, the version of the OS files in the dual-flash device 123 may not match the version of the running OS. In such a scenario, the dual-flash monitor module 109 compares the OS files in the dual-flash device 123 against the running OS version, and when there is a mismatch the new OS files can be copied to the dual-flash device. When the copy operations are done, the grub.cfg file content can be updated, and the old OS files can be deleted.

In one embodiment, the dual-flash monitor module 109 can generate a checksum file, such as a md5sum file, to check for file corruption in the dual-flash device. The checksum file for all the files in the dual-flash file system is generated by the dual-flash monitor module 109 when the system boots for the first time. The dual-flash monitor module 109 can then detect file corruption using the checksum file going forward.

In one embodiment, the dual-flash monitor module 109 can perform an OS recovery if there is an upgrade hang error during an OS upgrade. Prior to the OS upgrade module 107 performing an OS upgrade, the OS configuration data, such as registry database, can be saved into the dual-flash device 123. The BMC 119 can have a watchdog timer set to expire after failing to receive a heartbeat signal within one minute. During the upgrade process, the boot device can be set to the dual-flash device 123 in BIOS 121, and when the OS upgrade succeeds, the boot device can be set back to the hard disk 122. Thus, if the watchdog timer expires during the upgrade process, the BMC 119 can reset the appliance 101 to boot from the dual-flash device 123. The dual-flash device 123 then starts the original version of the OS installation and checks if there are any OS configuration data available in the dual-flash device 123, creating a hook in OS boot scripts to get this configuration data after the OS boot. The hook can then apply the OS configuration data to the OS after boot, and the OS is then recovered back to its original state before the attempted OS upgrade.

In some embodiments, the BMC 119 can also monitor the OS status during run-time and detect an OS hang error. If an OS hang error is detected, the system can first attempt to boot from the hard disk 122, using the OS boot module 106. The BMC 119 includes a counter, in this embodiment, and if the watchdog timer expires again, the BMC 119 can initiate an OS installation via the dual-flash device 123.

In some embodiments, when the dual-flash monitor module 109 finds that OS installation files need to be updated, or the dual-flash device 123 needs to be re-initialized, it may not take action immediately. Instead, it can accumulate a failure count and retry the check after a number of minutes (e.g., after three minutes). Only when the retry count has reached a certain number (e.g., five unsuccessful retries), then the BMC 119 can trigger the re-initialization of the dual-flash device 123 or the replacement of OS installation files.

In some embodiments, the alert system 113 can post an alert to indicate if required OS files cannot be found in the OS file system. To resolve such an alert, a user can place the required files to the specified directory of the OS file system using the dual-flash monitor module, in some embodiments.

Note that some or all of the components as shown and described may be implemented in software, hardware, or a combination thereof. For example, such components can be implemented as software installed and stored in a persistent storage device, which can be loaded and executed in a memory by one or more processors that, in response to instructions within the software, are configured to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

While the present disclosure mentions particular types of hardware systems, both CPU systems and hardware accelerators, the techniques disclosed herein are not limited to any particular type of processing system or hardware accelerator.

Figure 2:
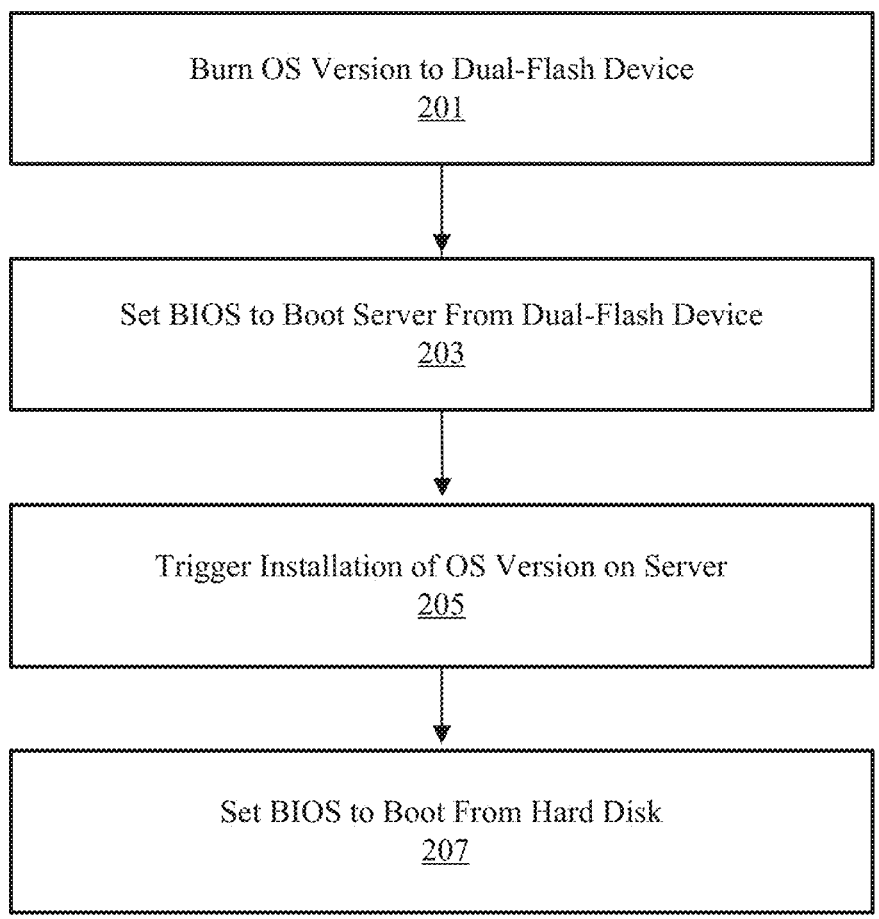
FIG. 2 is a flow diagram of an example method for installing an OS using a dual-flash device, according to an embodiment.

FIG. 2 is a flow diagram of an example method 200 for installing an OS using a dual-flash device, according to an embodiment. One or more operations of the process 200 can be executed, for example, by the dual-flash monitor module 109 and the server 101 illustrated and described in FIG. 1.

In operation 201, the desired OS version is burned to the dual-flash device on the server. In some embodiments, the OS version is burned to the dual-flash device via a BMC in connection with a user device. In some embodiments, the OS version is burned to the dual-flash device by physically removing the dual-flash device from the server. In some embodiments, the dual-flash device is a mirrored Internal Dual SD Module (IDSDM). In operation 203, the BIOS are set to boot the server from the dual-flash device.

Once the BIOS are set to boot the server from the dual-flash device, the method can continue at operation 205 with triggering installation of the OS version on the server from the dual-flash device. In some embodiments, triggering installation of the OS version from the dual-flash device includes installing the OS version to the hard disk of the server.

The method can continue at operation 207 with setting the BIOS to boot from the hard drive of the server after installation of the OS version. In some embodiments, the BIOS are set to boot from the hard drive automatically by a PTagent module after the OS is installed from the dual-flash device.

Figure 3:
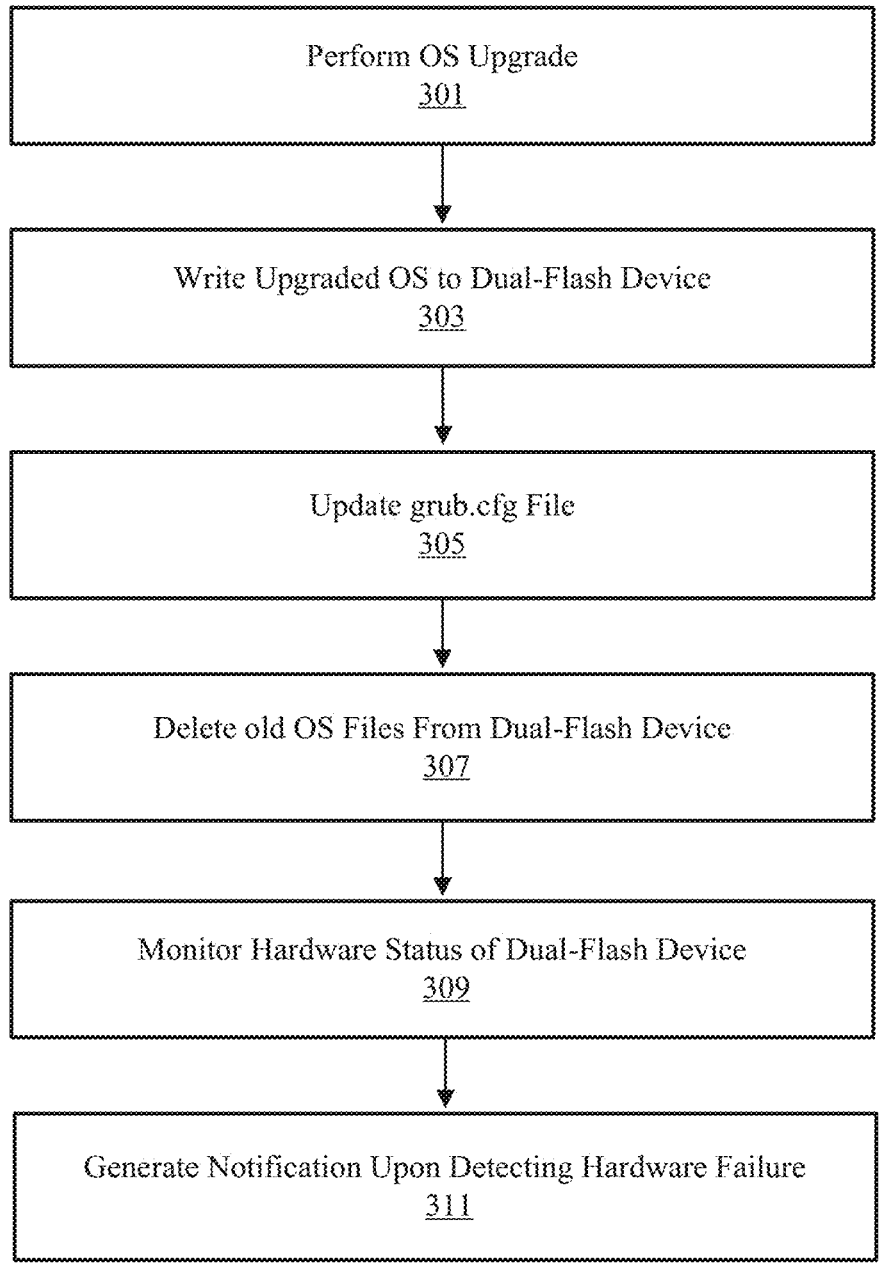
FIG. 3 is a flow diagram of an example method of monitoring and upgrading a dual-flash device, according to an embodiment.

FIG. 3 is a flow diagram of an example method 300 of monitoring and upgrading a dual-flash device, according to an embodiment. One or more operations of the process 300 can be executed, for example, by the dual-flash monitor module 109 and the server 101 illustrated and described in FIG. 1.

In operation 301, an OS upgrade is performed on a server. In some embodiments, the OS upgrade can be performed using an OS upgrade module. In some embodiments, a comparison can be performed between a boot drive of the server and the dual-flash device in order to determine any difference between the upgraded OS version and the OS version on the dual-flash device.

In operation 303, the upgraded OS is written to the dual-flash device. In some embodiments, writing the upgraded OS to the dual-flash device includes writing the upgraded OS to a first SD card of the dual-flash device before writing the upgraded OS to a second SD card of the dual-flash device. In some embodiments, a dual-flash monitor module performs a checksum after writing the upgraded OS to the first SD card and before writing the upgraded OS to the second SD card.

In operation 305, the grub.cfg file is updated to correspond to the upgraded OS version. In operation 307, old OS files are deleted from the dual-flash device once the upgraded OS is written and the grub.cfg file is updated.

In operation 309, a BMC monitors the hardware status of the dual-flash device in order to detect a hardware failure at the dual-flash device. In operation 311, a user notification is generated upon detection of a hardware failure, so that an engineer can replace the damaged hardware.

In some embodiments, the dual-flash monitor module can generate a checksum file to detect file corruptions within the dual-flash device.

Figure 4:
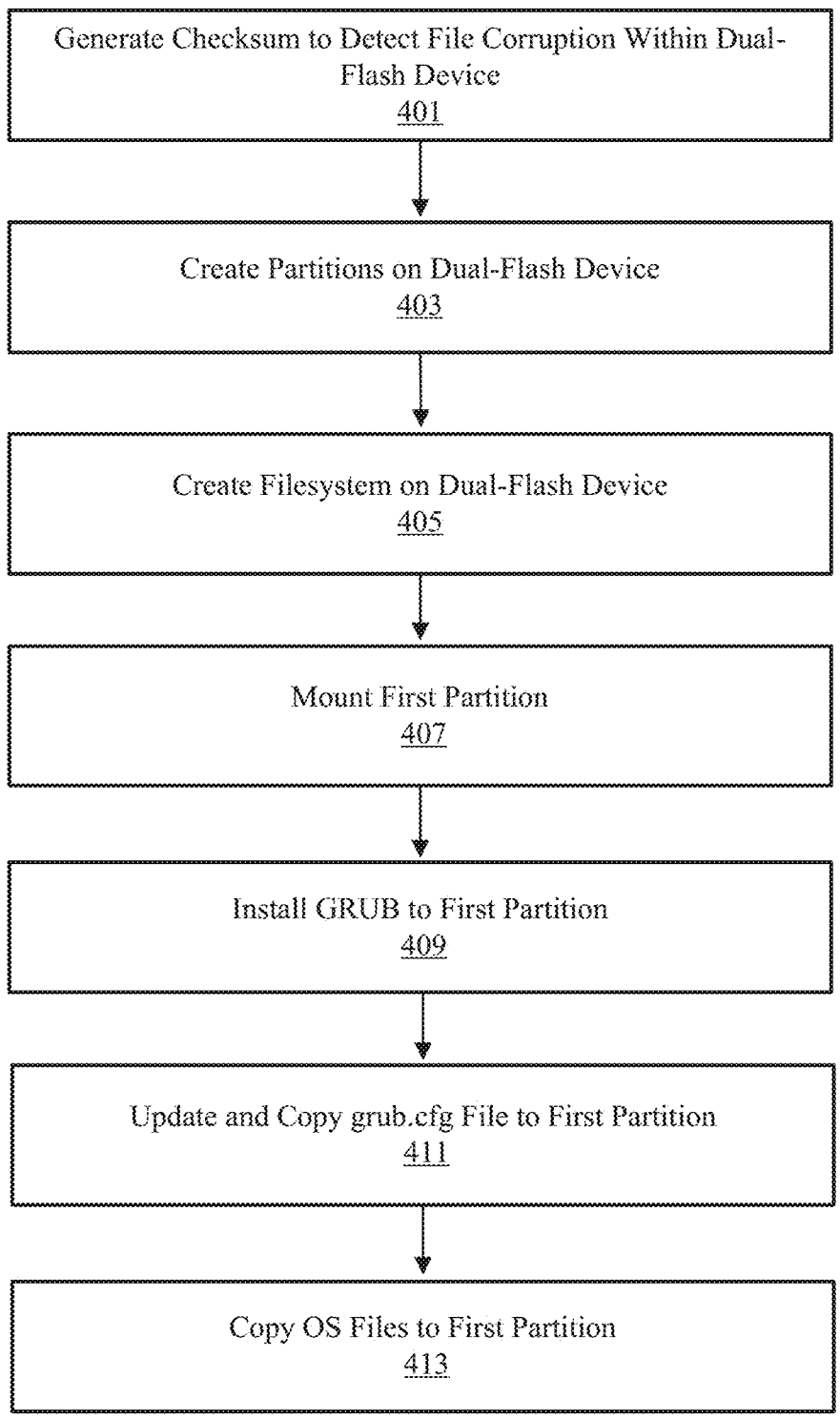
FIG. 4 is a flow diagram of an example method of re-initializing a dual-flash device, according to an embodiment.

FIG. 4 is a flow diagram of an example method 400 of re-initializing a dual-flash device, according to an embodiment. One or more operations of the process 400 can be executed, for example, by the dual-flash monitor module 109 and the server 101 illustrated and described in FIG. 1.

In operation 401, the dual-flash monitor module generates a checksum to detect file corruption within a dual-flash device. In one embodiment, the dual-flash monitor module can reinitialize the dual-flash device if files are corrupted. This may happen after two SD cards are replaced at the same time, or if files in the dual-flash device are corrupted.

In some embodiments, the method continues with creating partitions 403 on the dual-flash device. Once the partitions are created at 403, the method can continue with creating a filesystem 405 on the dual-flash device, and mounting 407 the first partition of the dual-flash device.

The method can continue with installing 409 a grand unified bootloader (GRUB) to the first partition of the dual-flash device. Once the GRUB is installed to the first partition of the dual-flash device, the method can continue with updating 411 and copying the grub.cfg file to the first partition of the dual-flash device. The method then continues with copying the OS files to the first partition of the dual-flash device.

Figure 5:
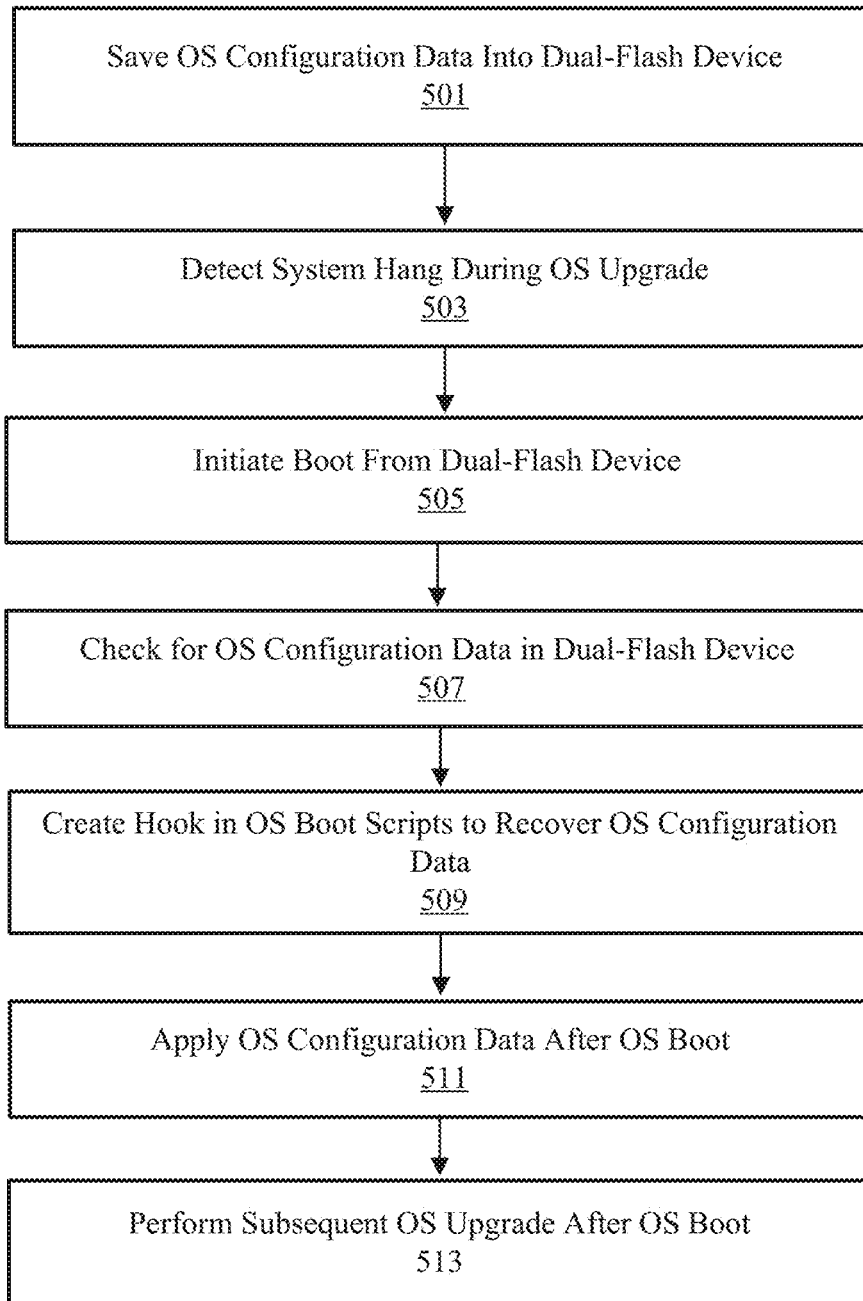
FIG. 5 is a flow diagram of an example method for recovering an operating system (OS) after an upgrade hang using a dual-flash device, according to an embodiment.

FIG. 5 is a flow diagram of an example method 500 for recovering an operating system (OS) after an upgrade hang using a dual-flash device, according to an embodiment. One or more operations of the process 500 can be executed, for example, by the dual-flash monitor module 109 and the server 101 illustrated and described in FIG. 1.

In operation 501, OS configuration data is saved into the dual-flash device before initiating an OS upgrade.

In operation 503, an OS upgrade hang error is detected. In some embodiments, the system hang is detected during the OS upgrade by a watchdog timer within a BMC. The watchdog timer can be set to expire after not receiving a heartbeat signal within one minute. In some embodiments, the dual-flash monitor module is configured to relay the heartbeat signal from an OS upgrade module to the BMC.

In operation 505, a boot of the server is initiated from the dual-flash device after the OS upgrade hang error is detected.

In operation 507, the dual-flash monitor module checks for OS configuration data in the dual-flash device. In operation 509, a hook is created in the OS boot scripts to recover the OS configuration data. In operation 511, the OS configuration data is applied after the OS boot. In this way, the OS version is reset to the previous version before the attempted OS upgrade.

In operation 513, a subsequent OS upgrade can be performed after the OS boot and after applying the OS configuration data.

Figure 6:
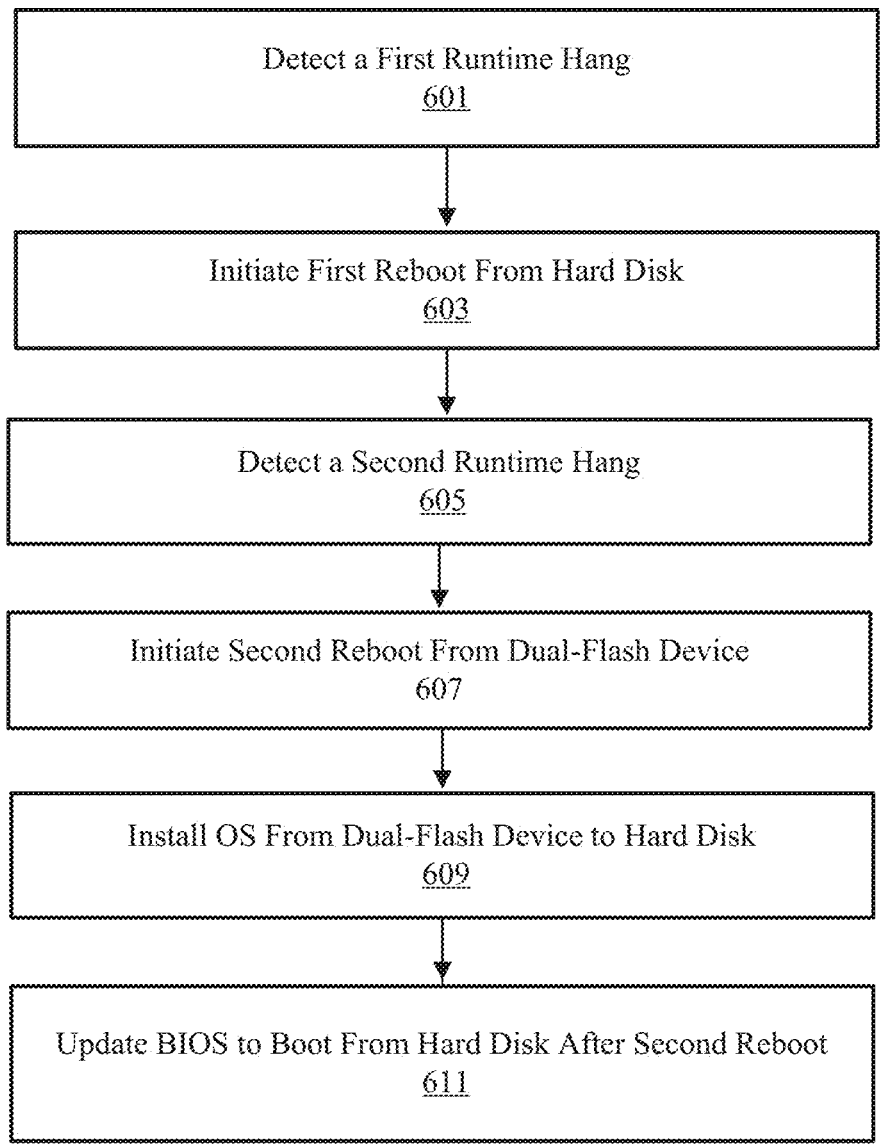
FIG. 6 is a flow diagram of an example method for recovering an operating system (OS) after a runtime hang using a dual-flash device, according to an embodiment.

FIG. 6 is a flow diagram of an example method 600 for recovering an operating system (OS) after a runtime hang using a dual-flash device, according to an embodiment. One or more operations of the process 600 can be executed, for example, by the dual-flash monitor module 109 and the server 101 illustrated and described in FIG. 1.

In operation 601, a first runtime hang of the server is detected. In some embodiments, the first runtime hang of the server is detected by a watchdog timer within a BMC. In some embodiments, the watchdog timer expires after failing to receive a heartbeat signal within one minute. In some embodiments, a dual-flash monitor module is configured to transmit the heartbeat signal to the BMC.

In operation 603, a first reboot is initiated from the hard disk. Since the server can encounter a runtime hang for many different reasons, after the first runtime hang error is detected, the system does not automatically reboot from the dual-flash device. Thus, the first reboot is initiated from the hard disk in an attempt to restore the OS version.

In operation 605, a second runtime hang of the server is detected. In some embodiments, the second runtime hang of the server is detected by a watchdog timer within a BMC. In some embodiments, the watchdog timer expires after failing to receive a heartbeat signal within one minute. In some embodiments, a dual-flash monitor module is configured to transmit the heartbeat signal to the BMC, and the second runtime hang is detected using a counter within the BMC.

In operation 607, a second reboot is initiated from the dual-flash device after the second runtime hang of the server is detected. Since the first reboot from the hard disk failed, this triggers a second reboot from the dual-flash device.

In operation 609, the OS version is installed from the dual-flash device to the hard disk after rebooting from the dual-flash device. Since the reboot from the hard disk failed, this can indicate an error in the OS installation files stored at the hard disk. Thus, after a successful reboot from the dual-flash device. The OS installation files can be installed from the dual-flash device to the hard disk.

In operation 611, the BIOS are updated to boot from the hard disk after completing the second reboot from the dual-flash device.

Figure 7:
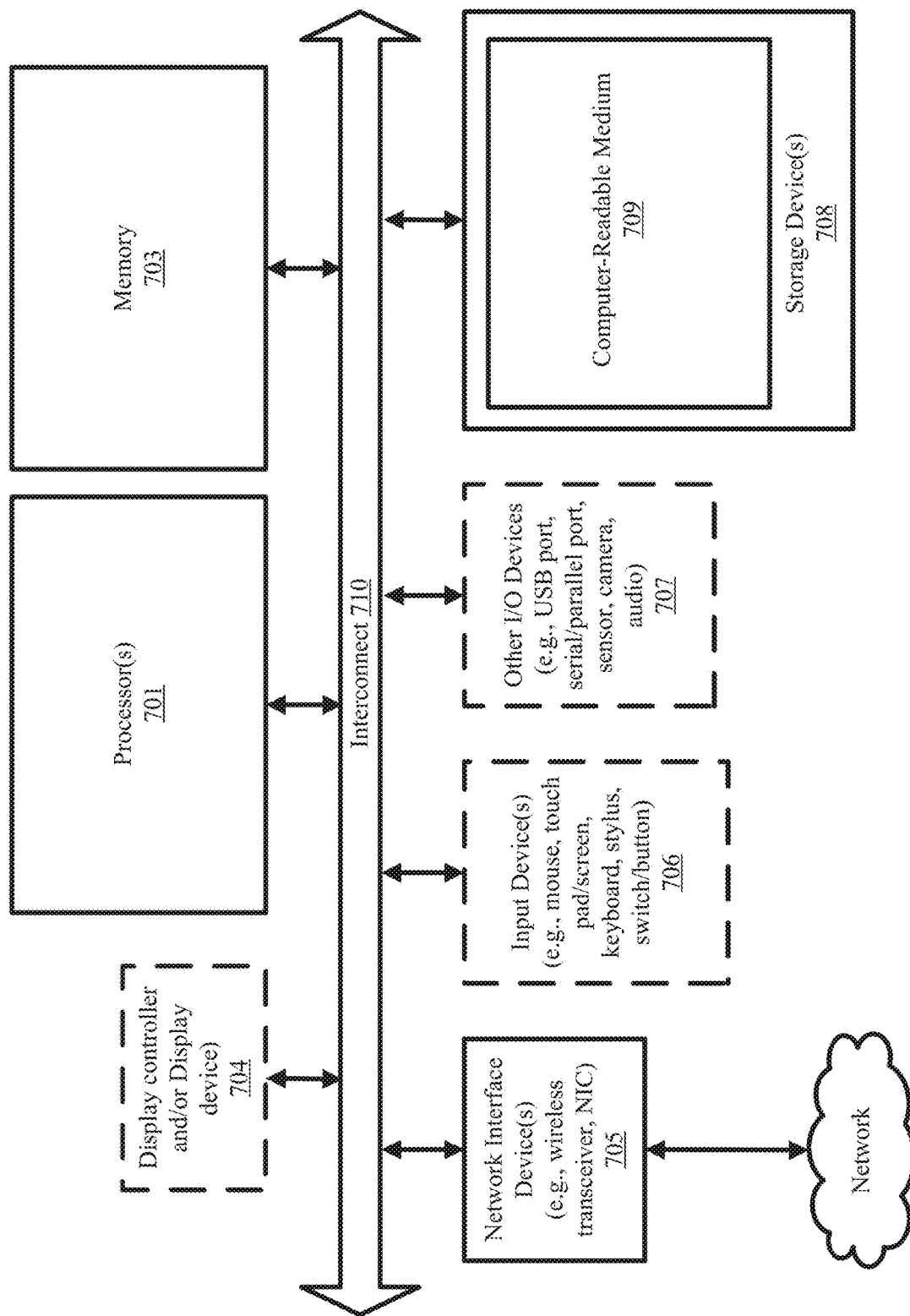
FIG. 7 is a block diagram illustrating an example of a data processing system that may be used with embodiments described herein.

FIG. 7 is a block diagram illustrating an example of a data processing system 700 that may be used with embodiments described herein. The data processing system 700 may represent any of the data processing systems described above and may perform any of the processes or methods described above. The data processing system 700 can include many different components. These components can be implemented as integrated circuits (ICs), discrete electronic devices, or other modules adapted to a circuit board such as a motherboard or add-in card of the computer system, or as components otherwise incorporated within a chassis of the computer system. Note also that the data processing system 700 is intended to show a high-level view of many components of the computer system. However, it is to be understood that additional components may be present in certain implementations and furthermore, different arrangement of the components shown may occur in other implementations. The data processing system 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment the data processing system 700 includes one or more processor(s) 701, memory 703, network interface devices 705, I/O devices 706, 707 and storage device(s) 708 connected via a bus or an interconnect 710. The one or more processor(s) 701 may be a single processor or multiple processors with a single processor core or multiple processor cores included therein. The processor(s) 701 may represent one or more general-purpose processors such as a microprocessor, a central processing unit (CPU), or the like. More particularly, the processor(s) 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor(s) 701 may be a low power multi-core processor, such as an ultra-low voltage processor, and may act as a main processing unit and central hub for communication with the various components of the system. Such processor can be implemented as a system on chip (SoC). The processor(s) 701 are configured to execute instructions for performing the operations and steps discussed herein. The data processing system 700 may further include a graphics/display subsystem 704, which may include a display controller, a graphics processor, and/or a display device. In one embodiment at least a portion of the graphics/display subsystem 704 is integrated into the processors(s) 701. The graphics/display subsystem 704 is optional and some embodiments may not include one or more components of the graphics/display subsystem 704.

The processor(s) 701 communicates with memory 703, which in one embodiment can be implemented via multiple memory devices to provide for a given amount of system memory. The memory 703 may include one or more volatile storage (or memory) devices such as random access memory (RAM), dynamic RAM (DRAM), synchronous DRAM (SDRAM), static RAM (SRAM), or other types of storage devices. The memory 703 may store information including sequences of instructions that are executed by the one or more processor(s) 701 or any other device. For example, executable code and/or data of a variety of operating systems, device drivers, firmware (e.g., input output basic system or BIOS), and/or applications can be loaded in the memory 703 and executed by one of the processor(s) 701. The operating system can be any kind of operating system such as, for example, Windows® operating system from Microsoft®, Mac OS®/iOS® from Apple, Android® from Google®, Linux®, Unix®, or other real-time or embedded operating systems such as VxWorks.

The data processing system 700 may further include I/O devices such as a network interface device(s) 705, input device(s) 706, and other I/O device(s) 707. Some of the input device(s) 706 and other I/O device(s) 707 may be optional and are excluded in some embodiments. The network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

The input device(s) 706 may include a mouse, a touch pad, a touch sensitive screen (which may be integrated with a display device of the graphics/display subsystem 704), a pointer device such as a stylus, and/or a keyboard (e.g., physical keyboard or a virtual keyboard displayed as part of a touch sensitive screen). For example, the input device(s) 706 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The other I/O device(s) 707 may also include an audio device. An audio device may include a speaker and/or a microphone to facilitate voice-enabled functions, such as voice recognition, voice replication, digital recording, and/or telephony functions. The other I/O device(s) 707 may also include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The other I/O device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of data processing system 700.

To provide for persistent storage of information such as data, applications, one or more operating systems and so forth, a mass storage (not shown) may also couple to the processor(s) 701. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of flash based storage to act as an SSD cache to enable non-volatile storage of context state and other such information during power down events so that a fast power up can occur on re-initiation of system activities. In addition, a flash device may be coupled to the processor(s) 701, e.g., via a serial peripheral interface (SPI). This flash device may provide for non-volatile storage of system software, including a basic input/output software (BIOS) as well as other firmware of the system.

The storage device(s) 708 may include computer-readable storage medium 709 (also known as a machine-readable storage medium) on which is stored one or more sets of instructions or software embodying any one or more of the methodologies or functions described herein. The computer-readable storage medium 709 may also be used to store the same software functionalities described above persistently. While the computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while the data processing system 700 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

What is claimed is:

1. A computer implemented method for recovering an operating system (OS) after an upgrade hang using a dual-flash device, the method comprising:

detecting the upgrade hang during performance of an OS upgrade by an OS upgrade module of the OS in connection with a boot drive and the dual-flash device, the OS upgrade comprising upgrading a recent version of the OS into an upgraded OS on the boot drive;

initiating a boot from the dual-flash device in response to the detected upgrade hang;

checking for OS configuration data in the dual-flash device including comparing recent OS files in the dual-flash device against a running OS version to determine whether is a mismatch, wherein when there is a mismatch between the recent OS files in the dual-flash device and the running OS version, the running OS version is copied to the dual-flash device and the recent OS files are deleted;

creating a hook in OS boot scripts to recover the OS configuration data in the dual-flash device after OS boot, wherein the OS configuration data comprise a recent version of the OS before performing the OS upgrade, the recent version of the OS different from a factory OS and the OS configuration data different from original factory settings; and applying the OS configuration data after OS boot.

2. The computer implemented method of claim 1, further comprising:

saving the OS configuration data into the dual-flash device before initiating the OS upgrade.

3. The computer implemented method of claim 1, further comprising:

performing a subsequent OS upgrade after OS boot and after applying the OS configuration data.

4. The computer implemented method of claim 1, wherein the system hang is detected during the OS upgrade by a watchdog timer within a baseboard management controller (BMC).

5. The computer implemented method of claim 4, wherein the watchdog timer expires after failing to receive a heartbeat signal within one minute.

6. The computer implemented method of claim 5, wherein a dual-flash monitor module is configured to relay the heartbeat signal from an OS upgrade module to the BMC.

7. A system for recovering an operating system (OS) after an upgrade hang using a dual-flash device, comprising:

a server;

a boot drive;

a baseboard management controller (BMC) configured to detect a system hang during an upgrade of an OS of the server by an OS upgrade module of the OS in connection with the boot drive and the dual-flash device, the upgrade of the OS comprising upgrading a recent version of the OS of the server into an upgraded OS on the boot drive;

the dual-flash device configured to initiate a boot upon detecting a system hang during the OS upgrade;

a dual-flash monitor module configured to check for OS configuration data in the dual-flash device including comparing recent OS files in the dual-flash device against a running OS version to determine whether is a mismatch, wherein when there is a mismatch between the recent OS files in the dual-flash device and the running OS version, the running OS version is copied to the dual-flash device and the recent OS files are deleted, and create a hook in OS boot scripts to recover the OS configuration data in the dual-flash device after OS boot, wherein the OS configuration data comprise the recent version of the OS before the upgrade of the OS, the recent version of the OS different from a factory OS and the OS configuration data different from original factory settings; and an OS boot module configured to apply the OS configuration data after the boot from the dual-flash device.

8. The system of claim 7, wherein the dual-flash monitor module is further configured to save the OS configuration data into the dual-flash device before the OS upgrade initiates.

9. The system of claim 7, further comprising:
an OS upgrade module configured to perform a subsequent OS upgrade after OS boot and after the OS boot module applies the OS configuration data.

10. The system of claim 9, wherein the BMC includes a watchdog timer configured to detect the system hang during the OS upgrade.

11. The system of claim 10, wherein the watchdog timer is configured to expire after failing to receive a heartbeat signal within one minute.

12. The system of claim 11, wherein a dual-flash monitor module is configured to relay the heartbeat signal from the OS upgrade module to the BMC.

13. A non-transitory computer-readable medium storing instructions which, when executed by one or more processors, cause the one or more processors to perform an upgrade hang operating system (OS) recovery operation using a dual-flash device, the operation comprising:
detecting a system hang during an OS upgrade by an OS upgrade module of the OS in connection with a boot drive and the dual-flash device, the OS upgrade comprising upgrading a recent version of the OS into an upgraded OS on the boot drive;
initiating a boot from the dual-flash device in response to the detected system hang;
checking for OS configuration data in the dual-flash device including comparing recent OS files in the dual-flash device against a running OS version to determine whether is a mismatch, wherein when there is a mismatch between the recent OS files in the dual-flash device and the running OS version, the running OS version is copied to the dual-flash device and the recent OS files are deleted;
creating a hook in OS boot scripts to recover the OS configuration data in the dual-flash device after OS boot, wherein the OS configuration data comprise a recent version of the OS before performing the OS upgrade, the recent version of the OS different from a factory OS and the OS configuration data different from original factory settings; and
applying the OS configuration data after OS boot.

14. The non-transitory computer-readable medium of claim 13, wherein the operation further comprises:
saving the OS configuration data into the dual-flash device before initiating the OS upgrade.

15. The non-transitory computer-readable medium of claim 13, wherein the operation further comprises:
performing a subsequent OS upgrade after OS boot and after applying the OS configuration data.

16. The non-transitory computer-readable medium of claim 13, wherein the system hang is detected during the OS upgrade by a watchdog timer within a baseboard management controller (BMC).

17. The non-transitory computer-readable medium of claim 16, wherein the watchdog timer expires after failing to receive a heartbeat signal within one minute.

18. The non-transitory computer-readable medium of claim 17, wherein a dual-flash monitor module is configured to relay the heartbeat signal from an OS upgrade module to the BMC.

* * * * *